S. E. TROUT.
FILING SYSTEM.
APPLICATION FILED SEPT. 15, 1913.
1,224,976.
Patented May 8, 1917.
*Fig. 1.*
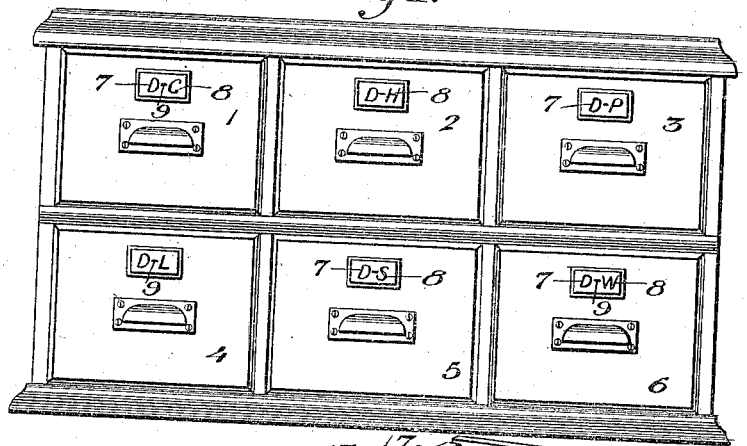
*Fig. 2.*
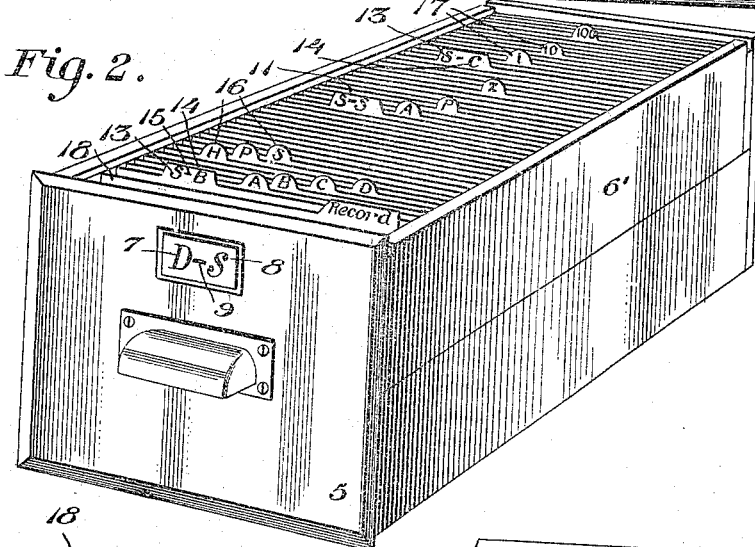
*Fig. 3.*
Witnesses
Philip E. Barnes
E. H. Parry
Inventor
Silas Edgar Trout
By Frank A. Kane
Attorney

UNITED STATES PATENT OFFICE.

SILAS EDGAR TROUT, OF PHILADELPHIA, PENNSYLVANIA.

FILING SYSTEM.

1,224,976.   Specification of Letters Patent.   Patented May 8, 1917.

Application filed September 15, 1913. Serial No. 789,862.

*To all whom it may concern:*

Be it known that I, SILAS EDGAR TROUT, a citizen of the United States, residing at Philadelphia, in the county of Philadelphia and State of Pennsylvania, have invented certain new and useful Improvements in Filing Systems, of which the following is a specification, reference being had therein to the accompanying drawings.

My invention comprises an improved filing system, by means of which, all of the correspondence, contracts, bills, invoices, notes, vouchers, or paper of any description, which may accumulate in the conduct of any business, can be classified and arranged so as to be easily located, and readily accessible at all times.

In handling the various matters to be filed away in a large establishment consisting of various departments, considerable difficulty is experienced in arranging and storing papers and the like. Many systems of alphabetical, numerical, and combination symbols, in conjunction with card and the like indices have been tried, but these have frequently proven unsatisfactory.

The present invention contemplates as an object, the provision of means for the identification and location of matters pertaining to a business or the like, whereby they may be segregated and filed with reference to a special department thereof, a unit of such department, or sub-classes of such unit. Alphabetical and numerical subdivisions of these generic divisions are coordinated therewith in a manner calculated to avoid complicated indicia, and to minimize confusion.

A filing system following the principles of this invention makes possible the location and identification of any matter pertaining to a business or the like, when the data would indicate the particular department to which the matter would naturally be referred: the particular unit of such department: the sub-classification of such unit: the name of the sender: the date of transmission: or the subject matter of the correspondence.

In conjunction with the present system there is provided a record for estimating the manner in which the various departments handle matters referred thereto, and indicating the present location of any matter which may be wanted. Cards are eliminated, as used in the ordinary sense when referring to card indices, by the present invention, all matters being filed directly, and provision made for their transfer and storage as filed.

In the drawings selected to illustrate the principles of my invention, and which are made a part hereof:—

Figure 1 is a front elevation of a set of files bearing identifications in accordance with an embodiment of my invention;

Fig. 2 is a view in perspective showing subdivisions of one of the file boxes; and Fig. 3 is a front elevation of a combined guide board and record used with the present system.

An embodiment of my invention in accordance with the principles thereof herein illustrated, may be said to comprise a series of filing devices identified by arbitrarily selected symbols representing departments. With these there are coördinated arbitrarily selected symbols representing units of said departments, both being shown on the outside of the devices in the present instance. The interior of the device is subdivided into sub-classes of said units, each sub-class being identified by symbols representing the unit and sub-class of such unit, disposed on suitable spacer or dividing instrumentality, and being in turn alphabetically and numerically subdivided.

As a component of the system a record is provided by means of which any information relative to the matters contained in the filing device in which it is located may be classified and arranged in digest form. In the present illustration, this record is shown as forming a part of one of the guide board or spacer members.

Referring now specifically to the drawing, there is illustrated in Fig. 1, a set of filing devices numbered 1 to 6, inclusively. These may be of any form, but preferably are provided with my improved insert box 6', which has been made the subject of a separate application for patent.

Conveniently located upon each filing device there is provided a means of identification comprising, in this instance, a primary symbol 7, a secondary symbol 8, connected by any suitable instrumentality, a hyphen 9 being here shown.

These symbols are arbitrarily selected, it being the intention of the present system that the primary symbol, such as 7, shall designate the first generic division into departments, while the secondary symbol, such as 8, when connected to the symbol 7, as shown, will designate a unit of the department.

To bring out more clearly the practical application of this principle, it will be seen that the primary symbol on each of the filing devices herein shown is the letter "D". This, we will say is arbitrarily selected to designate one of the large divisions under a municipal government, such as the department of public works. When there appears a second symbol connected with the first in the manner here shown, it is intended to designate the primary division of such department, or the unit thereof. Thus, the secondary symbol "G" could be used to designate a bureau of this department devoted to gas, the letter "H" to highways, "P" to city property, "L" to lighting, "S" to surveys, "W" to water, and the like. Hence, to one knowing the meaning of the symbols, it would be readily apparent from an inspection of the identification means "D-S" on the box shown in Fig. 2, that the contents of this receptacle related generically to the department of public works, and specifically, to the bureau thereunder devoted to surveys.

Under the system there are contemplated sub-classifications of the units, together with alphabetical and numerical subdivisions thereof. These are shown in one form in the filing device illustrated in Fig. 2.

A series of guide boards or spacer elements provided with identification tabs 11, are disposed in the receptacle. Upon these tabs there is an identification means comprising a primary symbol 13, preferably the symbol corresponding to the unit symbol, and a secondary symbol 14, connected thereto suitably, as by a hyphen 15. Under each of these sub-classifications there may be an alphabetical subdivision designated by tabs 16, and a numerical subdivision, designated by tabs 17. While these subdivisions are shown as forming a part of the sub-classifications of units, it will be understood that the departments, units of departments, and sub-classifications of units may all be provided with alphabetical and numerical subdivisions as convenience or necessity may demand.

Following the practical application of the system above referred to, the symbols 13, and 14, joined as by the hyphen 15, form an identification means comprising the unit of department represented by "S", and the sub-class of such unit, represented by the letter "B". Thus "B" could be arbitrarily selected to represent the sub-class of this department devoted to bridges, "S" to sewers, "C" to contracts, and the like. The alphabetical subdivisions illustrated by the tabs 16 are for filing according to the initials of names of senders, or the like, while the numerical subdivisions may be used for contracts, vouchers and the like.

To exemplify the workings of this system, should John Doe write a letter to the mayor of a city wherein this system is installed, and request that repairs be made to a certain bridge, the matter would be naturally referred to the department of public works. The file clerk would recognize that matters pertaining to bridges are handled by the bureau of this department devoted to surveys. File 5, shown in Fig. 2 bears the department and unit of department required, and on looking for the proper sub-classification of such unit, the tab bearing the symbol "S-B" is the sub-class of this unit devoted to bridges, and the letter is filed naturally under the alphabetical initial "D" corresponding to the name.

In conjunction with this system there is provided a record, which embodies in digest form all of the information relating to the matters filed, that the exigencies of the business may require. For convenience of illustration it is here shown as forming a part of one of the guide boards, but it will be understood that it may be used separately as convenience may demand.

In the present case, a guide or spacer 18 marked "Record" for purposes of identification, is provided with a space 19 for the reception of consecutive numbers. Each number space is in turn provided with subdivisions to accommodate the following data:—A space 20 for the reception of a symbol representing a department; 21, representing a unit of such department; a space 22 for the reception of the symbols representing sub-classifications of such unit; a space 23 for the initial of the clerk handling the matter; a space 24 for the reception of the date of receipt; 25 for the date answered; 26 for the name of the sender; and 27 for miscellaneous data, such as the name of the individual who may have taken the papers from the file that the numbers refer to.

With this record, each matter filed is given a number corresponding to the number on the record. Opposite this number there is then placed the symbols which will correspond with the identification of the location of these papers in the files. The name of the party to whom the matter was referred, the date of receipt, the date answered, and the name of the sender are then inserted in the spaces allotted for this purpose, and the matter is then filed. It is an easy matter to locate it again, as the record shows its location at all times, even though it be withdrawn for temporary use.

From the foregoing it will be seen that my system proposes the division of all matters to be filed into departments; units of departments; and sub-classifications of such units, each being given an arbitrarily selected symbol, and identification and location of these matters being made by the arrangement of these symbols either singly or collectively, and with or without alphabetical and numerical subdivisions. It will be understood, however, that while I have exemplified its practical use as relating to a classification of the departments of a municipal government, this system is in no way limited to the particular use disclosed, nor are the symbols to be construed as including only those made use of in the present illustration, as many changes in the selection and general arrangement of these symbols and record digest may be made without departing from the main principles of the invention, or sacrificing its chief advantages.

What I claim is:—

1. A filing system comprising filing elements carrying identifying symbols representative of departmental divisions of filable matter; elements carrying identifying symbols representative of units of said departments coördinating with said departmental symbols; elements carrying identifying symbols representative of sub-classes of said units of departments; and spacer elements some carrying alphabetical and some numerical symbols forming subdivisions of said sub-classes of units of departmental divisions of the filable matter.

2. A filing system comprising a plurality of constitutive filing elements; certain of said elements carrying an identifying symbol representative of a departmental division of the filable matter; certain others of said elements carrying an identification symbol representative of a unit of said departmental division said symbols coördinating with said departmental symbols; certain others of said elements carrying an identification symbol representative of sub-classes of said unit of departmental division; and spacer elements some carrying alphabetical and some numerical symbols subdividing said sub-classes of said unit of departmental division of the filable matter.

3. A filing system comprising a plurality of constitutive elements carrying coördinated symbols representative of departmental, unit of departmental, and sub-classes of said unit of departmental divisions of the filable matter; and a series of spacer elements some carrying alphabetical and some numerical symbols adapted when aggrouped to classify filable matter into departments, units of departments, sub-classes of units, and alphabetical and numerical subdivisions of said divisions.

In testimony whereof I affix my signature in the presence of two subscribing witnesses.

SILAS EDGAR TROUT.

Witnesses:
F. J. McMahon,
Evan T. Pennock.

Copies of this patent may be obtained for five cents each, by addressing the "Commissioner of Patents, Washington, D. C."